Figure 1:
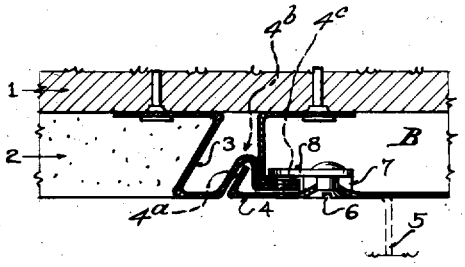

Sept. 21, 1926. E. A. RUSSACK Re. 16,428

FURRING FOR BUILDING STRUCTURES

2 Sheets-Sheet 1

Original Filed Feb. 9, 1925

Edwin A. Russack, INVENTOR.

BY

John Elias Jones, ATTORNEY.

Sept. 21, 1926. E. A. RUSSACK Re. 16,428

FURRING FOR BUILDING STRUCTURES

2 Sheets-Sheet 2

Original Filed Feb. 9, 1925

Edwin A. Russack, INVENTOR.

BY

John Chas. Jones ATTORNEY.

Reissued Sept. 21, 1926. Re. 16,428

UNITED STATES PATENT OFFICE.

EDWIN A. RUSSACK, OF COVINGTON, KENTUCKY.

FURRING FOR BUILDING STRUCTURES.

Original No. 1,585,561, dated May 18, 1926, Serial No. 8,003, filed February 9, 1925. Application for reissue filed August 9, 1926. Serial No. 128,264.

This invention relates to removable furring or covering used in building-structures for both incasing and concealing service-pipes of all kinds; electric-wiring; pneumatic-tubing; columns; wall slots or chases; vent-ducts; and, in fact, numerous other utility devices, and also, operating-mechanism of various types, adaptable to such incasement and otherwise preferably concealed from view and undue access or handling.

The objects of the invention are many and quite varied, but, more especially, they are intended to provide a furring or covering plate or panel, or the like, of any suitable material, but preferably of metal or a combination of materials to suit the surrounding surfaces, such furring inclosing the desired spaces or chambers in a building to inclose the above-named service devices of all kinds and where positioned, in corners, or in the faces of walls, or on ceilings, as the case might be, taking always into view, neatness, economy and free and easy access to the said service devices whenever occasion requires, or when necessary to get at them for initial placing, replacing, repairs, inspection and the like, when, otherwise, with the plaster covered or closed spaces, as heretofore in use, any of said inclosed service devices would be difficult to reach, expensive and inconvenient, and, ordinarily, necessitating the breaking-away or wrecking of a wall or a ceiling that always meant dust, dirt and damage to surroundings, as well as discomfort to the occupants of such buildings, that include in their category and mainly: hotels, office structures, stores, hospitals, public institutions, assembly and entertainment halls, court-rooms, and private dwellings, as well, that have heretofore suffered more or less from long and extended interruptions when the work to be done to any of said service devices was even very trifling, as well as on a large scale, and needing attention of some kind.

It will be readily seen that the invention herein is of inestimable value to the architect in providing his plans with such handy access to spaces for housing and concealing service-devices of all kinds in all types of building-structures and thereby renders his work, when embodied in the completed structure, one of extreme satisfaction and without any extra cost or labor in performing or installing the improvements that I will now proceed to describe in detail in connection with the accompanying several (2) sheets of drawings, in which—

Figure 3:
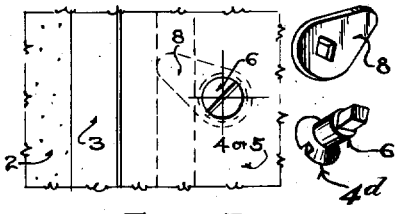
Figure 2:
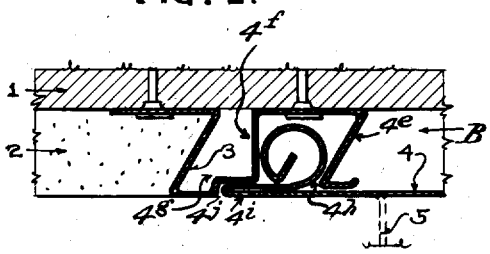
Figure 4:
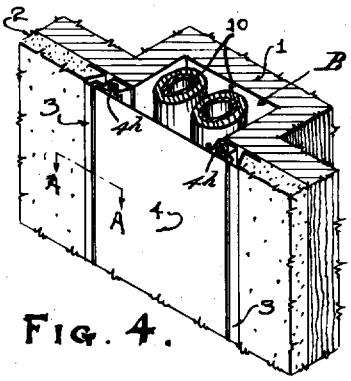
Figure 5:
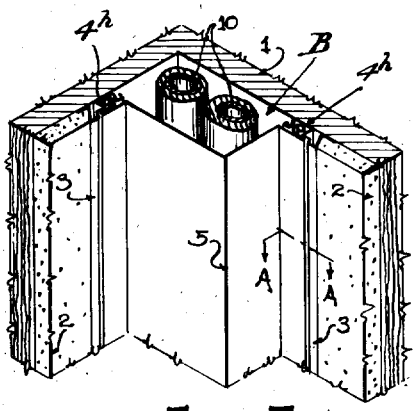
Figure 6:
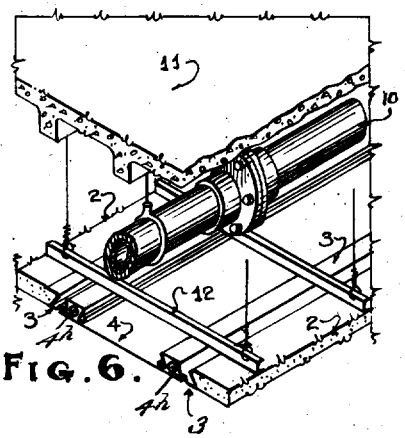
Figure 7:
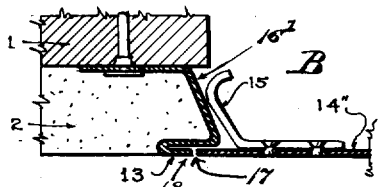
Figure 8:
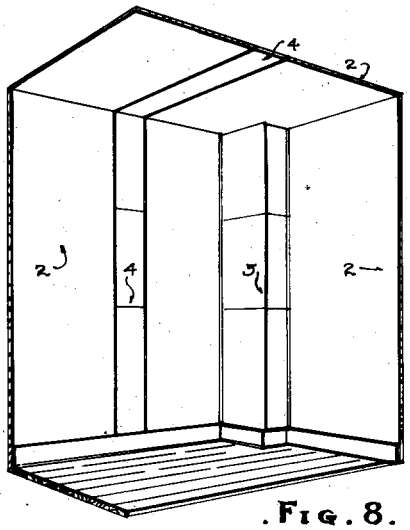
Figure 9:
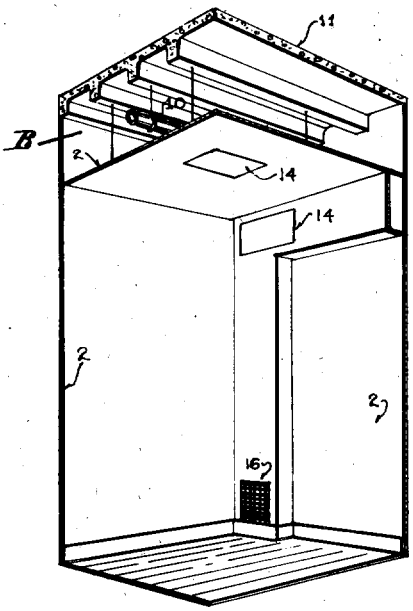

Figure 1 is a fragmentary transverse-section taken through the edge or starting-strip and illustrating one method of clamping the cover-plate in place thereon: Fig. 2, a similar fragmentary transverse-section, but showing how the said cover-plate is sprung or snapped into instant fastened-position on said starting-strip, and without the use of clamps; Fig. 3, a fragmentary front elevation of the said starting-strip and cover-plate seen in Fig. 1, together with perspective projections of the rivet and fastener-button elements of one of the clamp form of fastenings; Fig. 4, a fragmentary perspective in transverse section showing a wall slot or chase, together with a spring-fastened cover-plate and with a pair of insulated vertical pipes within the space or chamber provided by the said slot; Fig. 5, a fragmentary perspective similar to Fig. 4, but of a corner pipe-inclosing space or chase and a suitable corner-angled cover plate therefor; Fig. 6, a fragmentary perspective showing floor and ceiling combination with an intervening concealed pipe and with the said ceiling-portion of the view provided with one of my said spring-fastened cover-plates in alignment with the said piping for ready access thereto; Fig. 7, a fragmentary transverse-section taken through a flared or slanted screed-frame or starting-strip and a furring cover-plate, the latter having likewise flared or slanted rearwardly-extending spring-clips that are adapted to engage the said flared or slanted starting-strip for readily-detachable fastening-connection therewith, and especially adapted to the use of inspection plates or panels that are placed in permanent furring or coverings; Fig. 8, a fragmentary perspective showing part of the interior of a room, with my form of continuous removable or detachable furring provided therein; Fig. 9, a fragmentary perspective showing the interior of a room, together with a view of the floor immediately above it, and with concealed piping intervening the ceiling and the said floor; inspection and cleanout cover plates or traps, as well as a grating or grille, duly fastened in detachable position (by spring or clamp connection) in suitable frames in the ceiling and continuous furring provided under my invention herein; and Fig. 10, an interior room view, similar to Fig. 8, but otherwise showing other applications for detachable inspection-plates that are conveniently located and fastened in permanent furring or covering form in the walls, ceiling and corner of the room, and adapted to the handling of valves, unions, switches and the like concealed and contained in the space or chamber back of the furring.

It will be observed, viz: in Fig. 1, that the section A, A, is taken on the line so designated in Fig. 4, but with the clamp fastening that is shown in Fig. 3, and that the section A, A, in Fig. 2 is taken on the line so designated in Fig. 4, while it also provides for the same detachable spring-fastening seen in Fig. 5, and, also, that the said views, Figs. 1 and 2, are made on a somewhat larger scale than that of Figs. 3, 4 and 5.

In these views, 1 indicates the wall that is made of brick, tile, frame, or the like, and 2 indicates a facing of plaster, tile, wood, or the like on the wall, which latter may be an exterior or interior one such as suits its position in the building-structure. 3 indicates an edge strip or screed to which the furring or cover-plate 4 is adapted to be detachably-secured in the manner that I will now proceed to describe and which forms the most important feature of my invention herein, as well as the really essential one in carrying out the material part of my improvements in furring, for the proper reception of service devices or elements that are used in building-structures and hereinbefore fully enumerated.

One form of edging strip or screed 3, seen in Fig. 1, is made (in cross-section) with a Z-shape part to start with; thence the said initial Z-shape part develops into an inverted V-shape part that thence develops into a doubled-over or lapped part that is spot-welded together and thence develops into a right-angled member, with the outermost limbs or flanges of the first and last named members suitably attached in place on the inner face of the wall 1 and with the plaster 2 in seating-engagement with the first angle of the said first-named member and the said last-named angle-member forming an end wall of the enclosing chamber or chase B provided for the piping and other service elements and devices that it is intended to cover and conceal in the walls and ceilings of the building-structure. In said Fig. 1, too, is shown the cover-plate or furring-sheet 4 whose opposite vertical edges are flexed or bent over at an acute angle, as shown at $4^a$, to engage the said inverted V-shape member $4^b$ of the screed-edging, and tapered buttons 8 are provided at the inner square ends of the short arbors or pins 6 for clamping-engagement with the inner face of the said doubled edges or spot-welded portions $4^c$ of the said screed-edging to form suitable turn or rotatable members that are under the ready control of the countersunk cross-slotted heads $4^d$ of the said pins 6, washers 7 being used between the inner ends of the buttons and the countersunk parts of the cover-plate 4 for properly supporting said buttons in their clamping or locking movements.

Instead, however, of using the said swinging or clamp button locks for detachably-securing the cover-plate or furring in place in the screed-edgings at both sides of the entrance to the chamber or chase for the piping and service devices, I provide a much easier and quicker fastening, and practically just as good and effective, in the shape of a resilient or elastic friction or expansive-pressure cramp-connection between the opposite edges of the said detachable cover-plate or furring-sheet, such cramped expansive-pressure form being shown most noticeably in Figs. 2, 4, 5 and 6 of the drawings, and composed of the lateral resilient auxiliary extension or Z-shape formation $4^e$ on the outer edge of the right-angled member $4^f$ of the screed-edging, the said member $4^f$ being extended from a single-thickness right-angled bend $4^g$, and a resilient scroll-edge $4^h$ being made along the folded-over portion $4^i$ of the said side edges of the cover-plate and adapted to enter the contracted entrance to the space between the right angle $4^f$ and the resilient Z-extension $4^e$ for embracing the opposite edges of the cover-plate in readily attachable and detachable engagement.

It will be seen that the outer limb of the Z-edge $4^e$ is on a level with that of the outer face of the said single-thickness right-angled bend $4^g$, the latter forming a suitable shoulder or seat for the lapping edge of the said folded-over portion $4^i$ of each of the said side edges of the cover-plate when in using and closing position in the chamber or chase entrance.

To readily remove or release the cover-plate, the end of a screw-driver or the like is inserted in the narrow space $4^j$ between the angle $4^g$ and the said edges of the folded-over portions $4^i$.

The said cover-plate is easily sprung or snapped into fastened-place by inserting the resilient and rounded scroll-edges $4^h$ in the several screed channels or grooves and is tightly held there in due cramped relation, proof against the entrance into the apartment of dust, undesired air or draft, and other foreign matter from the furring chamber or chase wherein lie the piping and other service devices.

In Fig. 7, I show the furring filler or cover-plate 14 as having lateral resilient spring arms, or plates 15, riveted, spot-welded, or otherwise duly fastened on the inner face thereof and flared or slanted outwardly to coincide with the flared surfaces 16[1] of the screed-frame 13 and that is especially adapted to be sprung into position for use in connection with panels or inspection-plates that are placed in permanent furring or coverings. A slight or narrow space or crevice 17 is allowed between the edges of the said cover-plate 14 and the lapped-over edge 18 of the screed-frame 13 for the insertion of a pointed or sharpened implement in removing the said cover-plate from closing-position in the furring when it is desired to approach the interior of the chamber or chase for the insertion or other care of the service devices within. In this view, too, the numeral 1 indicates the wall or frame, and 2, the facing of plaster or the like, the same as in the views (excepting Fig. 6) on Sheet 1 of the drawings.

In Fig. 8, I show cover-plates 4 and 5 that are detachably-set in continuous furring in the face of a wall and a ceiling, and, also, in a corner, respectively, of a room.

In Fig. 9, I show a room in which are detachable inspection-plates 14 that are sprung or snapped into place in a screed-frame 13, and, also, a grille 16 that is similarly sprung or snapped into using-position in a screed. A ceiling-plate 14 is likewise provided in this view and leads to a space or receptacle above, that lies beneath the next floor 11 for incasing the pipe-service 10 and such other service devices as may be required and subject to ready and cleanly installation, inspection and general, as well as special, care.

Figure 10:
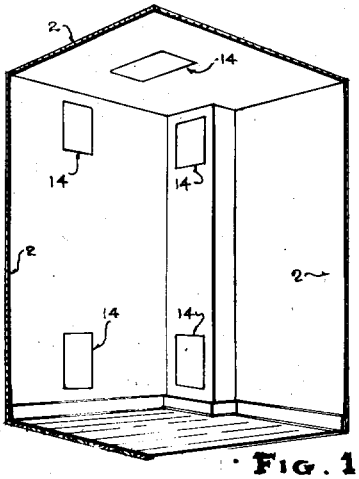

In Fig. 10, I show another interior-room view that displays detachable inspection-plates 14 in various position in the side-wall, corner and ceiling, in permanent furring, and conveniently located for the handling of concealed valves, unions, electric-switches and the like that are contained in the furring chase or receptacle beneath or back of the said covers or inspection-plates.

I claim:—

1. In a furring for inside wall, corner and ceiling parts of building-structures, the combination of a metallic orificed screed frame or edging, channeled inward-extensions provided along said edging and having further angular-extensions to form side-walls of a furring-chamber, an angular auxiliary-flange formed along each of said channeled inward-extensions, a removable cover-plate adapted to fit the orifice in the said screed frame and having resilient acutely-flanged edges that are adapted to freely engage the grooves of said channeled inward-extensions, and adjustable turn-buttons mounted along the cover-plate and adapted to engage the inner edges of the said angular auxiliary-flanges along the said channeled inward-extensions for detachably-locking the said cover-plate in place in the orifice of the furring, substantially as shown and described.

2. In a furring for building structures, the combination of a flared metallic screed or starting-strip having an attaching rearwardly-extending member and a parallel fore-member that is provided with a shouldered or offsetted outer face, a removable metallic cover-plate whose opposite edges are adapted to engage the said shouldered outer face of the screed and a series of laterally-flared or obtuse-angled resilient arms or catch-bars extending along the said opposite edges of the cover-plate for engagement with the said correspondingly-flared screed, substantially as shown and described.

3. In a furring for building structures, the combination of a metallic orificed frame, flange members for mounting the frame, an abutment ledge disposed interiorly of the frame, a cover-plate for entry into the orifice in the frame in abutment with the ledge means for yieldingly retaining the cover-plate in the last mentioned position, said means being disposed wholly within the orifice in the frame.

4. In a furring for building structures, the combination of spaced metallic screed strips, attaching flanges carried by the said strips, a ledge member secured to adjacent sides of said strips and disposed in offset relation with the edges thereof, a cover-plate adapted to seat upon said ledges and yieldable means for removably retaining the cover-plate upon its seat.

5. In a device of the class described, the combination with a building wall having an aperture therein of a frame adapted for mounting and bordering said aperture in the wall, a ledge on the frame disposed in offset relation with the face of the wall, a cover-plate adapted to be seated upon said ledge for disposing its outer face flush with the surface of said wall, a complementary means carried by the frame and the cover-plate for yieldingly retaining said cover-plate in the last mentioned position.

6. In combination with a wall structure having a recess in a face thereof, of a bordering frame having an opening therein, means for mounting the frame within the recess and flush with the face of the wall, a cover-plate for closing the opening in the frame and adapted to have its exposed face flush with the wall and frame and means for removably retaining the cover-plate in the last mentioned position.

In testimony whereof, I have hereunto subscribed my name this 6th day of August, 1926.

EDWIN A. RUSSACK.